United States Patent [19]

Fann

[11] 3,821,901

[45] July 2, 1974

[54] MUD BALANCE

[76] Inventor: James D. Fann, 8625 Meadowcroft, Houston, Tex. 77042

[22] Filed: Sept. 13, 1971

[21] Appl. No.: 179,938

[52] U.S. Cl. .................................. 73/437, 73/451
[51] Int. Cl. ......................... G01n 9/04, G01n 9/20
[58] Field of Search ............................ 73/433–437, 73/451–454, 433, 32; 177/168–170, 207, 212, 224

[56] References Cited
UNITED STATES PATENTS

| | | | |
|---|---|---|---|
| 2,694,566 | 11/1954 | Wolter | 177/212 |
| 2,722,838 | 11/1955 | VickRoy | 73/451 |

FOREIGN PATENTS OR APPLICATIONS

| | | | |
|---|---|---|---|
| 908,308 | 4/1954 | Germany | 73/433 |

*Primary Examiner*—James J. Gill
*Attorney, Agent, or Firm*—Carl B. Fox, Jr.

[57] ABSTRACT

Mud balance wherein the specific gravity of a fluid, or of a slurry, e.g., drilling fluid, is determined by immersion of a weight of known volume in the fluid or slurry, and the buoyancy of the fluid or slurry is determined directly. The buoyancy is measured by spring deflection.

9 Claims, 2 Drawing Figures

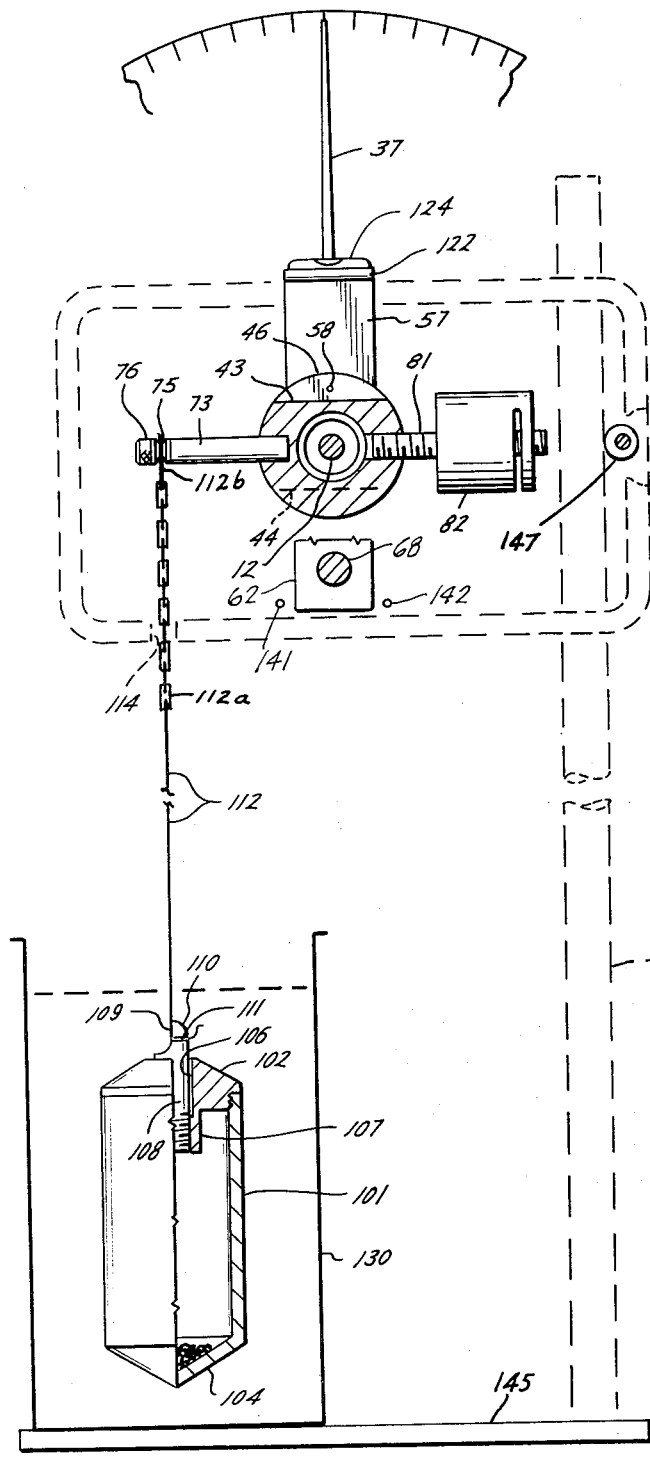

MUD BALANCE

SUMMARY OF THE INVENTION

The specific gravities of fluids, such as drilling muds, and other liquids the gravities of which must be known, are usually determined by measurement of the weight of a specific volume of the liquid measured in a receptacle of predetermined volume capacity. In the case of balances of the beam type having an integral sample receptacle, settling of solids may affect the specific gravity determination by changing the distance from the center of gravity of the sample to the fulcrum. Many other problems occur which render specific gravity determinations by heretofore known apparatuses inaccurate.

The measurement of specific gravity of a fluid by measurement of loss of weight (buoyancy) according to the invention is extremely accurate. The weight and the buoyed volume of the weight are accurately determinable so that the volume displaced by the weight in the fluid is extremely accurately known, and consequently the loss of weight due to buoyancy, with the accurate volume measurement, can be used to accurately determine the specific gravity of the fluid. The spring used for measurement of loss of weight due to buoyancy is preferably a spiral spring. The stress on the spring is low so that the spring is not subjected to conditions which might affect its properties.

Other objects and advantages of the invention will appear from the following detailed description thereof, with reference to the accompanying drawings.

BRIEF DESCRIPTIONS OF THE DRAWINGS

FIG. 1 is a vertical cross sectional view taken at the axis of the main shaft of an apparatus of preferred from according to the invention.

FIG. 2 is a partially schematic partial cross sectional view showing the balance assembly of the apparatus of FIG. 1, taken transversely of the main shaft of the apparatus at line 2—2 of FIG. 1.

DESCRIPTION OF THE PREFERRED EMBODIMENT

Describing the preferred embodiment of mud balance apparatus according to the invention which is shown in the drawings, a housing 10 has therewithin a disc-shaped cylindrical chamber 11 axially of which is disposed a shaft 12.

Shaft 12 is fixed through a fitting 14 having a cylindrical passage 15 within which the rearward end of shaft 12 is nonrotatively fixed. A friction washer 20 is disposed flushly against the back of fitting 14, and the other side of the friction washer is disposed against a circular cover plate or disc 22. The cover plate 22 is secured to close the back of housing 10 by a plurality of screws 25. The cylindrical rearward projection 26 of fitting 14 is received through a circular opening at the center of cover plate 22, and a ring washer 28, wavy washer 29, and snap ring 30 are disposed therearound. Snap ring 30 is fitted within a circular groove around the rearward end of portion 26 of fitting 14. The shaft 12 is therefore held against rotation except when forcibly rotated to a new position.

A circular dial plate 33 has a circular center opening which is disposed at concentric cylindrical shoulder 35 at the front of fitting 14. The dial plate has at its front side or face a dial scale in front of which is disposed index pointer 37. For accurate reading, the pointer 37 may have a finely inscribed straight index line.

A rotative balance body 41 is disposed around shaft 12 forward of fitting 14. Body 41 is formed from a cylindrical body of metal, and has upwardly forwardly disposed flat bottomed relief 43 and downwardly rearwardly disposed flat bottomed relief 44. The cutting of relief 43 leaves a circular sided formation 46 at the upper rear of body 41, and the cutting of relief 44 leaves a circular sided downward formation 47 at the forward end of body 41. Body 41 has a concentric bore 49 within which are disposed a central sleeve 50 and rearward and forward bearings 51, 52. Fitting 14 has a reduced circular concentric projection 54 at its forward end which spaces body 41 from fitting 14.

Formation 46 of body 41 has a cross slot within which the lower end of pointer carrier 57 is disposed and held by a screw 58. Pointer 37 is fixed to the back side of pointer carrier 57, to extend radially outwardly of the body 41 and shaft 12, in front of the dial plate 33.

Formation 47 of body 41 has a cross slot within which is disposed the upper end of plate 62 which is held in place by screw 64. Plate 62 has a hole at its horizontal center into which is fixed a spring anchor fitting 67. Spring anchor fitting 67 has a concentric cylindrical end 68 which is force fitted into the hole in plate 62, and is concentrically enlarged forwardly and then reduced to form a forward shaft to receive washers 70 and nut 71, the shaft end being threaded to receive the nut. The shaft has a slot 72 therethrough to receive the end of a spring 98.

Body 41 has at one side a cylindrical radially directed opening into which the inner end of a fulcrum arm 73 is press-fitted, the outer end of the fulcrum arm being reduced and threaded and having therearound an outwardly circularly V-notched fulcrum ring 75 held in place by a nut 76. Washers are used to accurately position the fulcrum ring around the threaded end portion of arm 73.

At the other side of body 41 from arm 73, a threaded shaft 81 is screwed into a tapped opening in the side of body 41 and has threaded thereon a weight 82 which is adjustably positioned by movement along the threads.

A spring hub 85 is fixed to shaft 12 by plural set screws 86 which engage the shaft at recess 87. Forward along the shaft from hub 85 the shaft passes through a circular opening in the front 89 of body 10 and has another recess 91 therearound to receive set screw 93 of adjustment hub 94 which has enlarged disc 95 at its forward end.

A flat spiral spring 98 is carried on a spring seat around hub 85, and the outer spring end is affixed to spring anchor fitting 67 by passing the spring end through slot 72, and tightening nut 71.

A weight body 101 has a cap 102. Weight body 101 is in the form of a cylindrical cup, having a conical lower end 104. The cap is conical at its upper surface and is reduced at its lower portion to fit within the upper end of body 101, and is silver soldered to the cup upon assembly. The lower end of bore 106 concentrically through cap 102 is threaded at its lower part within sleeve formation 107. A connection pin 108 is threaded at its lower end and is screwed into the threads of bore 106, and cemented in place. Pin 108 is hemispherically formed at its upper end and is relieved at one side at 109. The remaining half dome formation 110 has an angular slot 111 from one side which slants angularly upwardly. The slot 111 is adapted to receive the lower end of a string 112 to suspend the weight body in vertical position. The upper end of the string is tied to chain 112a. Chain 112a has an upper end link 112b having a knife edge which is hung over fulcrum ring 75 within the V-notch circularly thereround. The chain passes through an opening 114 through the lower sidewall of body 10, body 10 being of reduced rectangular form at 117, its forward end. At the upper side thereof there is provided a window opening 119 which is closed by a window 120. Window 120 is transparent to permit reading of the dial scale on the front face of dial plate 33. Fitting 57, which supports the pointer, has an upwardly concave curved formation 122 at its upper end which holds a level vial 124 which is used to position pointer 60 directed vertically upward.

The spring 98 is sized and adjusted to indicate specific gravities linearly over the full length of the scale. The scale on the face of dial plate 33 is circular and preferably extends almost completely around the dial plate. Pin 138 on cover 22 and pin 139 on dial plate 33 are positioned so that the dial plate may rotate to move pin 139 from one side of pin 138 around almost full circle to the other side of pin 138. But pins 138 and 139 interfere and act as stops to prevent more than one circle rotation of the dial plate in either direction. With the pointer 37 vertical, the scale on the dial plate can be rotated from one of its ends, with pin 139 at one side of pin 138, over the scale to the other scale end with pin 139 at the other side of pin 138, and back and forth to any scale position between these terminal positions.

The rotative movements of body 41 and pointer 37 are limited by pins 141, 142, which extend from the front wall 89 of housing 10 to limit the back and forth movement of plate 62 which is affixed to body 41. The pointer can move (rotate) between a position with one side of plate 62 against pin 141 and a position with the other side of plate 62 against pin 142. The pointer is vertical, which is indicated by level vial 124 at the midpoint of its swing, and can swing only a small angle to each side of its midpoint.

To determine the specific gravity of a liquid or slurry, weight body 101, suspended by string 112 and chain 112a from fulcrum arm 73 as described, is completely immersed in the liquid in a vessel 130 which is placed upon base 145 of support rod 146. Rod 146 passes through holes through the upper and lower walls of the front part of housing 10, the housing being movable upwardly and downwardly along rod 146 to proper height and releasably locked in position by lock assembly 147, these support elements being indicated schematically in FIG. 2.

The weight body is buoyed by the liquid or slurry, and its buoyed weight acts downwardly on fulcrum arm 73. Weight 82 acts downwardly on rod 81 as a counterbalance of the buoyed weight of weight body 101. The dial scale is rotated by turning disc 95, to change the tension of spring 98, until the pointer 37 is vertical as indicated by level vial 124. Then the specific gravity of the fluid in vessel 130 is read directly on the scale.

Limited swing of the pointer and body 41 is necessary to maintain the spring tension. A different point of the dial scale will be behind the pointer at its vertical position depending on the specific gravity of the fluid, since different spring tension is required to bring the pointer to vertical position from different buoyed weights of weight body 101.

To pre-adjust the apparatus for use, the weight of the weight body may be adjusted by placing lead shot or the like within the weight body. This is done by unthreading and removing pin 108. After proper adjustment of the weight, pin 108 is re-cemented in place. The length of pin 108 screwed into the sleeve threads may be adjusted to adjust the volume of the weight without changing its weight. The length of spring 98 is adjustable by moving the spring end to different positions in slot 72. Pointer 37 is brought to proper position by loosening screws 86 and turning hub 85, then straightening the screws. By proper adjustments of the spring, the spring length or span is adjusted such that correct specific gravity may be determined along the full length of the scale. The balance is purposely made unstable, i.e. the counterbalance weight 82 is on a line through the axis of shaft 12 and the knife edge of element 112b is supported on fulcrum ring 75 above such line, so that weight 101 must move up and down to achieve balance. This movement of the weight in coming to balance is advantageous in viscuous and thixotropic fluids and gels in that it helps break down the immobility thereof as the weight comes to balance.

The balance is full floating, so that base 145 need not be brought to exact level for use of the balance.

While a preferred embodiment of apparatus has been described and shown in the drawings, many modifications thereof may be made by a person skilled in the art without departing from the spirit of the invention, and it is intended to protect by Letters Patent all forms of the invention falling within the scope of the following claims.

I claim:

1. Apparatus for measuring the specific gravity of fluids such as liquids, slurries and suspensions, comprising rotatable body means, means for supporting said body means for rotation about an axis through said body means, spring means having one end connected to said body means and biasing said body means in one direction of rotation, immersible weight means adapted to bias said body means in the other direction of rotation against said spring means bias, arcuate scale means disposed for rotation about said body means axis, means for rotating said scale means, the other end of said spring means being connected to said scale rotating means and rotated therewith whereby the spring tension is increased when said scale means is rotated in one direction and whereby the spring tension is decreased when said scale means is rotated in the other direction, pointer means extending from said body means adjacent said scale means to indicate relative rotational positions of said body means and scale means, means indicating a definite rotational position of said body means so that said body means may be returned to said definite rotational position, means for limiting rotation of said body means in both directions from said definite rotational position; said body means having adjustable weight means at least partially counterbalancing said rotational bias of said weight means, and including means for limiting rotation of said scale means to the arcuate length of said scale means; said pointer means being directed vertically when said body means is in said definite rotational position, said means indicating a definite rotational position of said body means comprising a level gage movable with said pointer means to indicate the vertical position of said pointer means and said definite rotational position of said body means; whereby when said weight means is immersed in a liquid, slurry or suspension to displace its volume, and said scale rotating means is rotated to adjust the spring tension to bring said body means to said definite rotational position with said pointer means in vertical position as indicated by said level gage, the position of said pointer means with respect to said scale means indicates the specific gravity of said liquid, slurry or suspension.

2. The combination of claim 1, including shaft means coaxial with said body means axis and having said body means rotatably mounted thereon, and including plate means rotatable with said shaft means, said scale means being circularly disposed around said plate means and being rotated with said plate means upon rotation of said shaft means.

3. The combination of claim 2, said spring means comprising a spiral spring having its inner end fixed to said shaft means and having its outer end fixed to said body means at a location spaced from said axis.

4. The combination of claim 3, said body means having a first outwardly extending arm means having said outer end of said spring means affixed thereto, a second outwardly extending arm means having said pointer means and level gage affixed thereto, a third outwardly extending arm means having said adjustable weight means adjustably affixed thereto, and a fourth outwardly extending arm means having notch means, said immersible weight means being suspended from knife edge means supported at said notch means of said fourth arm means.

5. The combination of claim 4, the volume of said immersible weight means being adjustable.

6. The combination of claim 4, the weight of said immersible weight means being adjustable.

7. The combination of claim 6, said apparatus being enclosed by housing means having window means for viewing of said scale means, pointer means and level gage.

8. The combination of claim 4, said immersible weight means including socket means and pin means receivable into said socket means to adjustable extent of the length of said pin means, whereby adjustment of the position of said pin means in said socket means adjusts the volume of said immersible weight means without alteration of its weight.

9. The combination of claim 8, said pin means being removable from said socket means to permit introduction and removal of auxiliary weight means within said immersible weight means to adjust its weight.

* * * * *